United States Patent [19]
Niiyama

[11] Patent Number: 5,383,379
[45] Date of Patent: Jan. 24, 1995

[54] HYDRAULIC PRESSURE CONTROL FOR AUTOMATIC TRANSMISSION

[75] Inventor: Tsunefumi Niiyama, Kamifukuoka, Japan

[73] Assignee: Honda Giken Kogyo Kabushiki Kaisha, Tokyo, Japan

[21] Appl. No.: 150,577

[22] Filed: Nov. 9, 1993

Related U.S. Application Data

[63] Continuation of Ser. No. 894,776, Jun. 5, 1992, abandoned.

[30] Foreign Application Priority Data

Jun. 7, 1991 [JP] Japan ................................. 3-164023
Jun. 7, 1991 [JP] Japan ................................. 3-164024
Jun. 7, 1991 [JP] Japan ................................. 3-164025

[51] Int. Cl.⁶ .......................................... F16H 61/14
[52] U.S. Cl. .............................. 74/733.1; 74/730.1; 192/3.28
[58] Field of Search ............... 74/730.1, 731.1, 732.1, 74/733.1; 192/3.28, 3.31

[56] References Cited

U.S. PATENT DOCUMENTS

| | | | |
|---|---|---|---|
| 4,345,489 | 8/1982 | Müller et al. | 75/867 X |
| 4,395,927 | 8/1983 | Müller et al. | 74/869 |
| 4,729,461 | 3/1988 | Nishikawa et al. | 192/3.31 |
| 4,875,391 | 10/1989 | Leising et al. | 74/866 |
| 4,989,702 | 2/1991 | Yoshimura et al. | 74/890 X |
| 5,010,990 | 4/1991 | Yoshimura et al. | 74/890 X |
| 5,060,769 | 10/1991 | Yoshimura et al. | 192/3.31 X |

FOREIGN PATENT DOCUMENTS 59-99163 6/1984 Japan ................................. 74/890
62-127552 6/1987 Japan .

*Primary Examiner*—Dirk Wright
*Attorney, Agent, or Firm*—Lyon & Lyon

[57] ABSTRACT

A hydraulic pressure control apparatus for an automatic transmission includes brakes and clutches to be engaged for selectively establishing gear positions in response to a controlling hydraulic pressure from a hydraulic pressure source. Two solenoid-operated valve assemblies are disposed in a hydraulic passage between the hydraulic pressure source and the brakes and clutches. The solenoid-operated valve assemblies are independently operable in response to respective control signals for controlling the supply of the controlling hydraulic pressure from the hydraulic pressure source to the brakes and clutches.

15 Claims, 7 Drawing Sheets

HYDRAULIC PRESSURE CONTROL FOR AUTOMATIC TRANSMISSION

This is a continuation of co-pending applications Ser. No. 07/894,776 filed on Jun. 5, 1992, now abandoned.

BACKGROUND OF THE INVENTION

1. Field of the Invention

The present invention relates to a hydraulic pressure control apparatus for controlling gear shifts, a transmission lock-up, or the like in an automatic transmission.

2. Description of the Prior Art

Automatic transmissions automatically effect gear shifts depending on the speed of automobiles on which the automatic transmissions are mounted, the loads on the engines of the automobiles, etc. Many automatic transmissions incorporate electric controls for controlling such gear shifts. It is well known in the art that hydraulic clutches and brakes (hydraulically operated engaging means) for controlling gear shifts are controlled by working oil that is supplied from solenoid-operated valves or the like.

Hydraulic pressure may be supplied from a single solenoid-operated valve to a single hydraulically operated engaging means. In such a configuration, the hydraulic pressure may be supplied from the solenoid-operated valve directly to the hydraulically operated engaging means, so that operation of the hydraulically operated engaging means can be controlled by controlling operation of the solenoid-operated valve.

Alternatively, a single solenoid-operated valve may be used to control operation of a plurality of hydraulically operated engaging means. More specifically, as shown in U.S. Pat. No. 4,875,391, for example, a single solenoid-operated valve serves to control operation of a low & reverse brake and a lock-up clutch of a torque converter. The low & reverse brake is a hydraulically operated engaging means (brake) which is engaged when the gear position is a 1st (low) or reverse position. The lock-up clutch is not engaged when the gear position is a 1st or reverse position. The lock-up clutch is engaged under certain conditions when the gear position is a 2nd or higher position (medium- or high-speed position). However, the low & reverse brake is not engaged in such a 2nd or higher position.

U.S. Pat. No. 4,875,391 discloses a directional control valve disposed in a hydraulic passage supplied with the hydraulic pressure from the solenoid-operated valve. The directional control valve is shiftable by a signal pressure for selecting a gear position. Depending on a gear position to be achieved, a signal pressure is applied to shift the directional control valve to supply hydraulic pressure from the solenoid-operated valve selectively to the low & reverse brake or the lock-up clutch. Specifically, when the 1st or reverse gear position is selected, the directional control valve is shifted to direct the hydraulic pressure from the solenoid-operated valve to the low & reverse brake to control operation of the low & reverse brake. When a medium- or high-speed gear position is selected, the directional control valve is shifted to direct the hydraulic pressure from the solenoid-operated valve to the lock-up clutch to control operation of the lock-up clutch.

Therefore, the single solenoid-operated valve can control operation of the hydraulically operated engaging means (low & reverse brake) for controlling gear shifts and also operation of the hydraulically operated engaging means (lock-up clutch) for controlling a transmission lock-up.

In the event of a failure of the directional control valve, however, any desired gear position cannot be achieved, making the control of the transmission unstable.

For example, when the spool of the directional control valve sticks and is held in a position to supply the hydraulic pressure from the solenoid-operated valve to the low & reverse brake, an attempt to actuate the lock-up clutch in a medium- or high-speed gear position causes the hydraulic pressure from the solenoid-operated valve to act on the low & reverse brake. Therefore, even though the lock-up clutch is to be actuated, the low & reverse brake is actuated instead. Since the low & reverse brake is actuated when a medium- or high-speed gear position is established, the transmission control becomes unstable.

Some hydraulic pressure control apparatus for automatic transmissions have a plurality of solenoid-operated valves corresponding respectively to clutches and brakes for controlling gear shifts. The clutches and brakes are supplied with working oil from the corresponding solenoid-operated valves to control their operation.

If one of the solenoid-operated valves fails to operate, then the clutch or brake which is supplied from working oil from that solenoid-operated valve cannot be controlled in operation. Therefore, in the event of a failure of one of the solenoid-operated valves while no hydraulic pressure is being supplied to a corresponding clutch or brake, the clutch or brake cannot be engaged, failing to achieve a corresponding gear position.

Automatic transmissions for automobiles usually have a plurality of gear positions in a forward range (e.g., a D range) and a single gear position in a reverse range. Consequently, even if a certain gear position cannot be established due to a failure of one of the solenoid-operated valves, the resultant problem may not be very serious because other gear positions can be established to make the automobile run. If the solenoid-operated valve corresponding to the reverse gear position fails to operate, however, the reverse gear position cannot be achieved, and the automobile cannot run backwards.

As well known in the art, the lock-up clutch is controlled by a control apparatus comprising a lock-up control valve for controlling the supply and discharge of a controlling hydraulic pressure for the control of operation of the lock-up clutch, and a solenoid-operated valve for controlling the supply and discharge of a pilot hydraulic pressure for the control of operation of the lock-up control valve (see, for example, Japanese laid-open patent publication No. 62-127552).

With the conventional control apparatus, when the solenoid-operated valve fails to operate while it is being actuated, the lock-up clutch remains engaged, holding the engine output shaft mechanically connected to drive road wheels. Therefore, upon stoppage of the automobile, the engine stalls.

One conventional solution has been to supply the pilot hydraulic pressure from the solenoid-operated valve to the lock-up control valve only in a medium- or high-speed gear position in which the lock-up clutch is to be engaged, and to prevent the pilot hydraulic pressure from acting on the lock-up control valve in a gear position such as a low-speed gear position or a reverse gear position in which the lock-up clutch is to be disengaged. To effect such hydraulic pressure control, the pilot hydraulic pressure may be supplied to the lock-up control valve through a shift valve that establishes a gear position in which the lock-up clutch is not to be engaged.

Automatic transmissions for automobiles establish a low-speed gear position when the speed of the automobile is low. When the automobile stops, it stops while the automatic transmission is in a low-speed gear position, e.g., a 1st gear position. According to the above conventional solution, therefore, when the automobile stops in the event of a failure of the solenoid-operated valve while it is being actuated, since the selected gear position is a low-speed gear position upon automobile stoppage and no pilot hydraulic pressure acts on the lock-up control valve, the lock-up clutch is disengaged regardless of whether the solenoid-operated valve is actuated or not. Consequently, the engine is prevented from stalling.

As described above, the engine is prevented from stalling upon a failure of the solenoid-operated valve. However, if the lock-up control valve itself fails to operate and remains shifted to engage the lock-up clutch, e.g., if the spool of the lock-up control valve sticks against movement from the position in which hydraulic pressure is supplied to engage the lock-up clutch, then the engine is not prevented from stalling.

SUMMARY OF THE INVENTION

In view of the aforesaid drawbacks of the conventional hydraulic pressure control apparatus, it is an object of the present invention to provide a hydraulic pressure control apparatus which is capable of operating in a certain control mode even in the event of a failure of a control valve which supplies a controlling hydraulic pressure selectively to hydraulically operated engaging means, such as hydraulic clutches and brakes for controlling gear shifts, a torque converter lock-up clutch, etc., in an automatic transmission.

Another object of the present invention is to provide a hydraulic pressure control apparatus which is capable of establishing a certain gear position for stable gear shift control even in the event of a failure of a control valve which supplies a single controlling hydraulic pressure selectively to an engaging means for establishing a low-speed gear position and an engaging means for achieving a lock-up.

Still another object of the present invention is to provide a hydraulic pressure control apparatus which is capable of disengaging a lock-up clutch to reliably prevent an engine from stalling even in the event of a failure of a control valve which controls the supply of a controlling hydraulic pressure to an engaging means for achieving a lock-up.

A further object of the present invention is to provide a hydraulic pressure control apparatus which is capable of controlling the supply of a controlling hydraulic pressure to engaging means for establishing gear positions even in the event of a failure of a control valve which controls the supply of the controlling hydraulic pressure to those engaging means.

According to the present invention, there is provided a hydraulic pressure control apparatus for an automatic transmission, comprising a hydraulic pressure source for producing a controlling hydraulic pressure, hydraulically operated engaging means for being engaged in response to the controlling hydraulic pressure from the hydraulic pressure source, and two solenoid-operated valve means, disposed in a hydraulic passage between the hydraulic pressure source and the hydraulically operated engaging means and independently operable in response to respective control signals, for controlling the supply of the controlling hydraulic pressure from the hydraulic pressure source to the hydraulically operated engaging means.

The two solenoid-operated valve means may be connected in series with each other in the hydraulic passage between the hydraulic pressure source and the hydraulically operated engaging means, the two solenoid-operated valve means being responsive to the respective control signals for being opened to supply the controlling hydraulic pressure from the hydraulic pressure source to the hydraulically operated engaging means to engage the hydraulically operated engaging means.

The two solenoid-operated valve means may be connected parallel to each other in the hydraulic passage between the hydraulic pressure source and the hydraulically operated engaging means, the two solenoid-operated valve means being responsive to the respective control signals for being opened to supply the controlling hydraulic pressure from the hydraulic pressure source to the hydraulically operated engaging means through at least one of the solenoid-operated valve means to engage the hydraulically operated engaging means.

According to the present invention, there is also provided a hydraulic pressure control apparatus for an automatic transmission, comprising a plurality of hydraulically operated engaging means for controlling gear positions in the automatic transmission, hydraulically operated lock-up control means for achieving a lock-up in the automatic transmission, a hydraulic pressure source for supplying a controlling hydraulic pressure to the hydraulically operated engaging means, and two valve means disposed in a hydraulic passage between the hydraulic pressure source and one of the hydraulically operated engaging means which is engageable when a predetermined one of the gear positions is selected, the two valve means being shiftable between operating positions in response to a control signal corresponding to the predetermined one of the gear positions. One of the two valve means opens the hydraulic passage when shifted into one of the operating positions which corresponds to the predetermined one of the gear positions and for connecting the hydraulic pressure source to the hydraulically operated lock-up control means when shifted into the other of the operating positions. The other of the two valve means opens the hydraulic passage when shifted into the operating position corresponding to the predetermined one of the gear positions and for connecting the hydraulically operated engaging means to a drain when shifted into the other operating position.

With the above arrangement, in the event of a failure of one of the two valve means causing the controlling hydraulic pressure from the hydraulic pressure source to be supplied to the hydraulically operated engaging means, insofar as the other valve means operates normally, the hydraulically operated engaging means is connected to the drain through the other normal valve means, preventing the controlling hydraulic pressure to be applied to operate the lock-up control means from acting on the hydraulically operated engaging means.

According to the present invention, there is also provided a hydraulic pressure control apparatus for an automatic transmission, comprising a hydraulic pressure source for producing a controlling hydraulic pressure, hydraulically operated engaging means for controlling a lock-up of the automatic transmission, and two valve means, connected in series with each other and disposed in a hydraulic passage between the hydraulic pressure source and the hydraulically operated engaging means and shiftable into an operating position in response to a control signal, for connecting the hydraulically operated engaging means through the hydraulic passage to the hydraulic pressure source to engage the hydraulically operated engaging means to achieve the lock-up of the automatic transmission.

The hydraulically operated engaging means comprises a lock-up clutch, the two valve means comprising, respectively, a lock-up control valve for selectively supplying and discharging the controlling hydraulic pressure to and from the lock-up clutch, and a backup valve for selectively supplying and discharging the controlling hydraulic pressure in response to a controlling hydraulic pressure to select gear positions in the automatic transmission.

The lock-up clutch may comprise a lock-up hydraulic chamber and a lock-up piston movably disposed in the lock-up clutch and pressable in response to the controlling hydraulic pressure introduced into the lock-up hydraulic chamber, the lock-up clutch being engageable when the lock-up piston is pressed, the lock-up control valve comprising a valve disposed in a lock-up hydraulic passage between the hydraulic pressure source and the lock-up hydraulic chamber for selectively opening and closing the lock-up hydraulic passage, the backup valve comprising a valve disposed in the lock-up hydraulic passage between the hydraulic pressure source and the lock-up control valve for closing the lock-up hydraulic passage when the at least one of the gear positions in which the lock-up of the automatic transmission is not to be achieved is selected.

The hydraulic pressure control apparatus includes a torque converter, and the lock-up clutch may comprise a casing and a lock-up piston pressable into engagement with the casing in response to an internal pressure of the torque converter, the lock-up clutch being engageable when the lock-up piston is pressed, the lock-up piston and the casing defining a back pressure chamber therebetween, the lock-up control valve comprising a valve disposed in a lock-up hydraulic passage for introducing the internal pressure of the torque converter into the back pressure chamber, for selectively opening and closing the lock-up hydraulic passage, the lock-up control valve being connected to a bypass hydraulic passage which communicates with the back pressure chamber when the lock-up hydraulic passage is closed, the backup valve being disposed in the bypass hydraulic passage for introducing the internal pressure of the torque converter into the bypass hydraulic passage when the at least one of the gear positions in which the lock-up of the automatic transmission is not to be achieved is selected, and for connecting the bypass hydraulic passage to a drain when the other gear positions in which the lock-up of the automatic transmission is to be achieved are selected.

When a gear position in which the lock-up clutch is not to be engaged is selected, the backup valve operable under the controlling hydraulic pressure for establishing gear positions controls the lock-up controlling hydraulic pressure to disengage the lock-up clutch. Even if the lock-up control valve fails to operate keeping the lock-up clutch engaged, the lock-up clutch is disengaged by the backup valve in the gear position in which the torque converter is not to be locked up.

Furthermore, a hydraulically operated engaging means for controlling gear positions is operated under working oil supplied from a plurality of solenoid-operated valves. When the working oil is supplied from at least one of the solenoid-operated valves, the hydraulically operated engaging means is engaged. The hydraulically operated engaging means should preferably be an engaging means for establishing a reverse gear position.

Even if one of the solenoid-operated valves fails to supply the working oil due to a malfunction, the hydraulically operated engaging means is supplied with the working oil from the other normal solenoid-operated valve. The hydraulically operated engaging means can be engaged when supplied with the working oil from at least one of the solenoid-operated valves.

Consequently, in the event of a failure of one of the solenoid-operated valves, the normal solenoid-operated valve can supply the working oil to operate the hydraulically operated engaging means. Unless all the solenoid-operated valves for supplying the working oil to the hydraulically operated engaging means fail to operate, the hydraulically operated engaging means can be operated.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
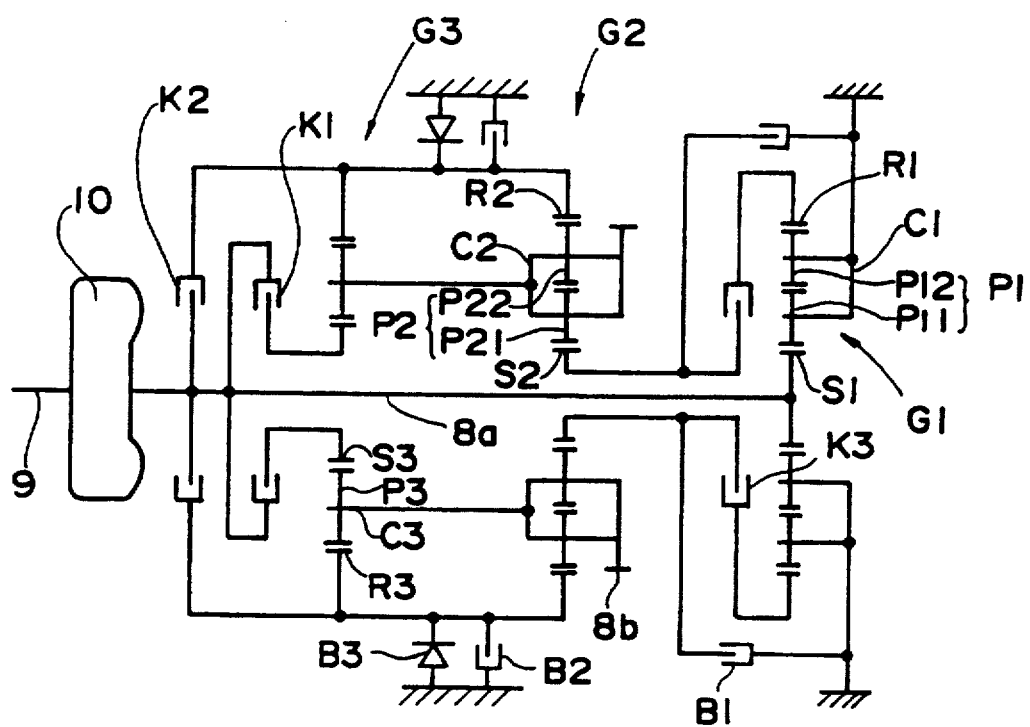
FIG. 1 is a diagram showing a skeleton of power transmitting paths of an automatic transmission which incorporates a hydraulic pressure control apparatus according to the present invention.

FIG. 1 schematically shows power transmitting paths of an automatic transmission which incorporates a hydraulic pressure control apparatus according to the present invention. The automatic transmission is mounted on an automobile (not shown).

The automatic transmission shown in FIG. 1 comprises a torque converter 10 coupled to an engine output shaft 9 of the engine mounted on the automobile, and a transmission mechanism having a transmission input shaft 8a connected to the turbine of the torque converter 10.

The transmission mechanism has first, second, and third planetary gear trains G1, G2, G3 disposed in juxtaposed relationship on the transmission input shaft 8a. The planetary gear trains G1, G2, G3 have respective first, second, and third sun gears S1, S2, S3 positioned centrally, respective first, second, and third planet pinions P1, P2, P3 meshing with the first, second, and third sun gears S1, S2, S3, respectively, and revolvable around the first, second, and third sun gears S1, S2, S3 while rotating about their own axes, respective first, second, and third carriers C1, C2, C3 on which the first, second, and third planet pinions P1, P2, P3 are rotatably supported, the second and third carriers C2, C3 being rotatable in unison with the second and third planet pinions P2, P3 as they revolve around the second and third sun gears S2, S3, and respective first, second, and third ring gears R1, R2, R3 comprising internal gears meshing with the first, second, and third planet pinions P1, P2, P3, respectively.

Each of the first and second planetary gear trains G1, G2 comprises a double-pinion planetary gear. The first planet pinion P1 comprises pinion gears P11, P12, and the second planet pinion P2 comprises pinion gears P21, P22.

The first sun gear S1 is fixedly coupled to the input shaft 1, and the first carrier C1 is fixed against rotation at all times. The first ring gear R1 is disconnectably connected to the second sun gear S2 through a third clutch K3. The second sun gear S2 can be fixed against rotation by a first brake B1. The second carrier C2 is directly coupled to the third carrier C3, and also to an output gear 8b. Therefore, rotation of the second and third carriers C2, C3 is transmitted from the output gear 8b as output rotation of the transmission mechanism. The second ring gear R2 is directly coupled to the third ring gear R3. The second and third ring gears R2, R3 can be fixed against rotation by a second brake B2. The second and third ring gears R2, R3 are disconnectably connected to the transmission input shaft 8a by a second clutch K2. The third sun gear S3 is disconnectably connected to the transmission input shaft 8a through a first clutch K1. The second and third ring gears R2, R3 can also be braked by a one-way brake B3 parallel to the second brake B2.

The first, second, and third clutches K1, K2, K3, and the first and second brakes B1, B2 are controlled, i.e., engaged and disengaged, to establish gear positions and control gear shifts. Specifically, when the first, second, and third clutches K1, K2, K3, and the first and second brakes B1, B2 are engaged and disengaged as shown in Table 1 below, the transmission mechanism can establish five forward gear positions (1ST, 2ND, 3RD, 4TH, and 5TH) and a single reverse gear position (REV). Speed reduction ratios in those gear positions are given by way of example in Table 1 though they vary depending on the number of teeth of the gears.

TABLE 1

| GEAR POSITION | K1 | K2 | K3 | B1 | B2 | RATIO |
|---|---|---|---|---|---|---|
| 1ST | o |  |  |  | (o) | 3.577 |
| 2ND | o |  |  | o |  | 2.100 |
| 3RD | o |  | o |  |  | 1.400 |
| 4TH | o | o |  |  |  | 1.000 |
| 5TH |  | o | o |  |  | 0.711 |
| REV |  |  | o |  | o | 2.953 |

In Table 1, those clutches and brakes which are marked with "o" are engaged. The second brake B2 is marked with "(o)" in the 1ST gear position because power from the engine can be transmitted through the one-way brake B3 even if the second brake B2 is not engaged. Specifically, when the first clutch K1 is engaged, power from the engine can be transmitted in the 1ST gear position even if the second brake b2 is not engaged. However, since power from the road to the engine cannot be transmitted, an engine brake cannot be applied in the 1ST gear position when the second brake b2 is not engaged, and an engine brake can be applied in the 1ST gear position when the second brake b2 is engaged.

Figure 2:
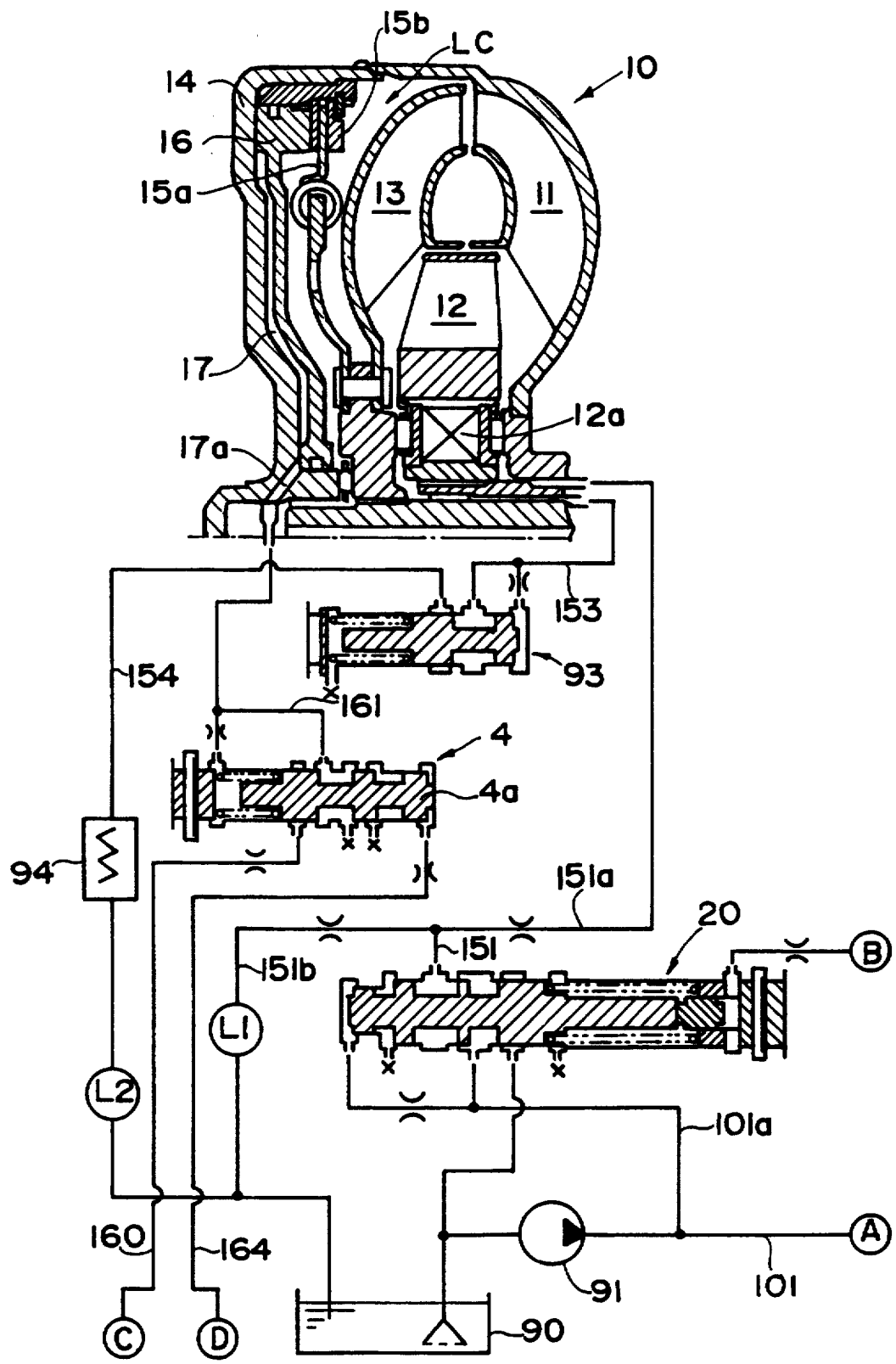
FIGS. 2 through 4 are circuit diagrams, partly in cross section, of a hydraulic pressure circuit of the hydraulic pressure control apparatus.
Figure 3:
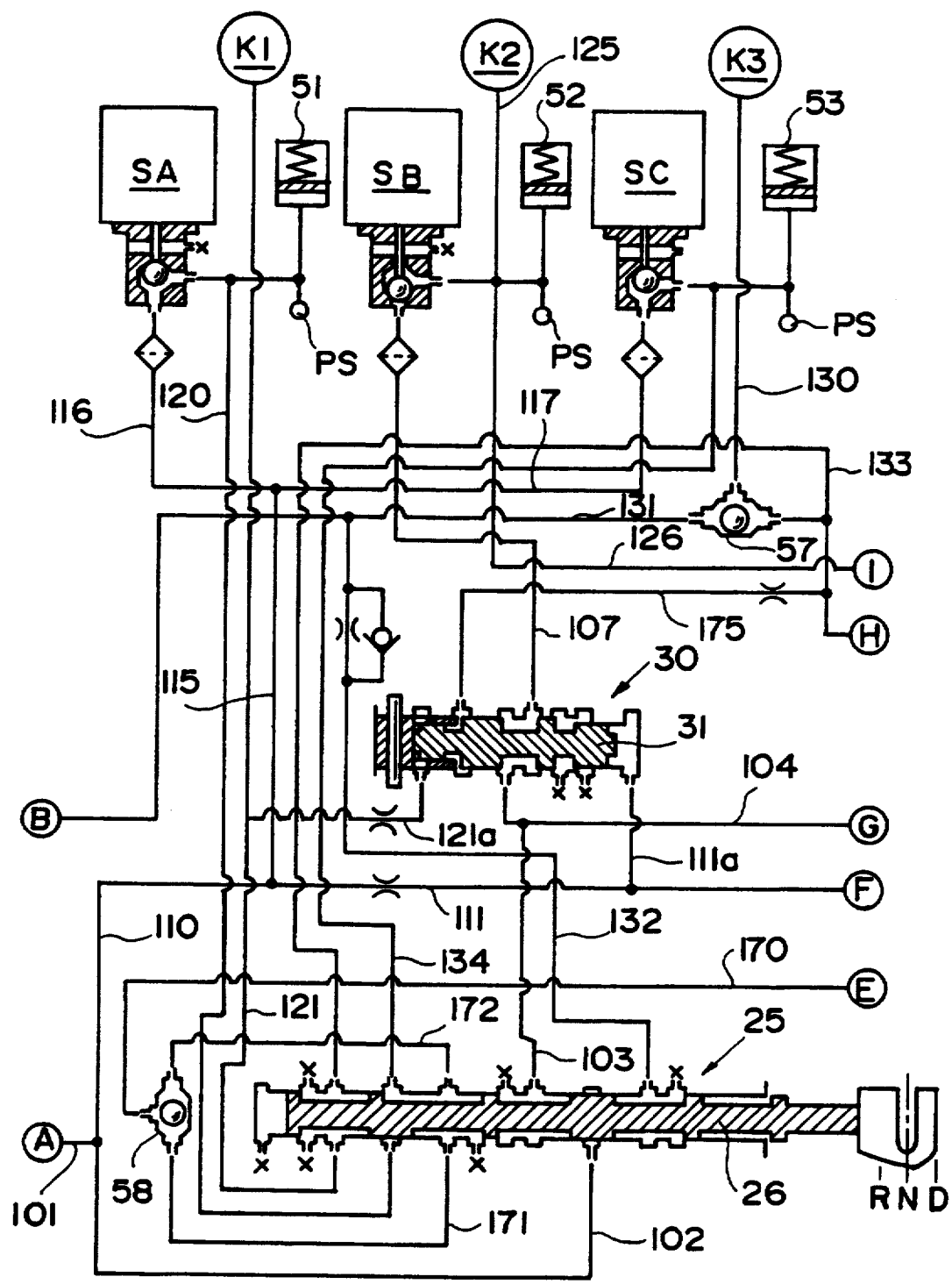
Figure 4:
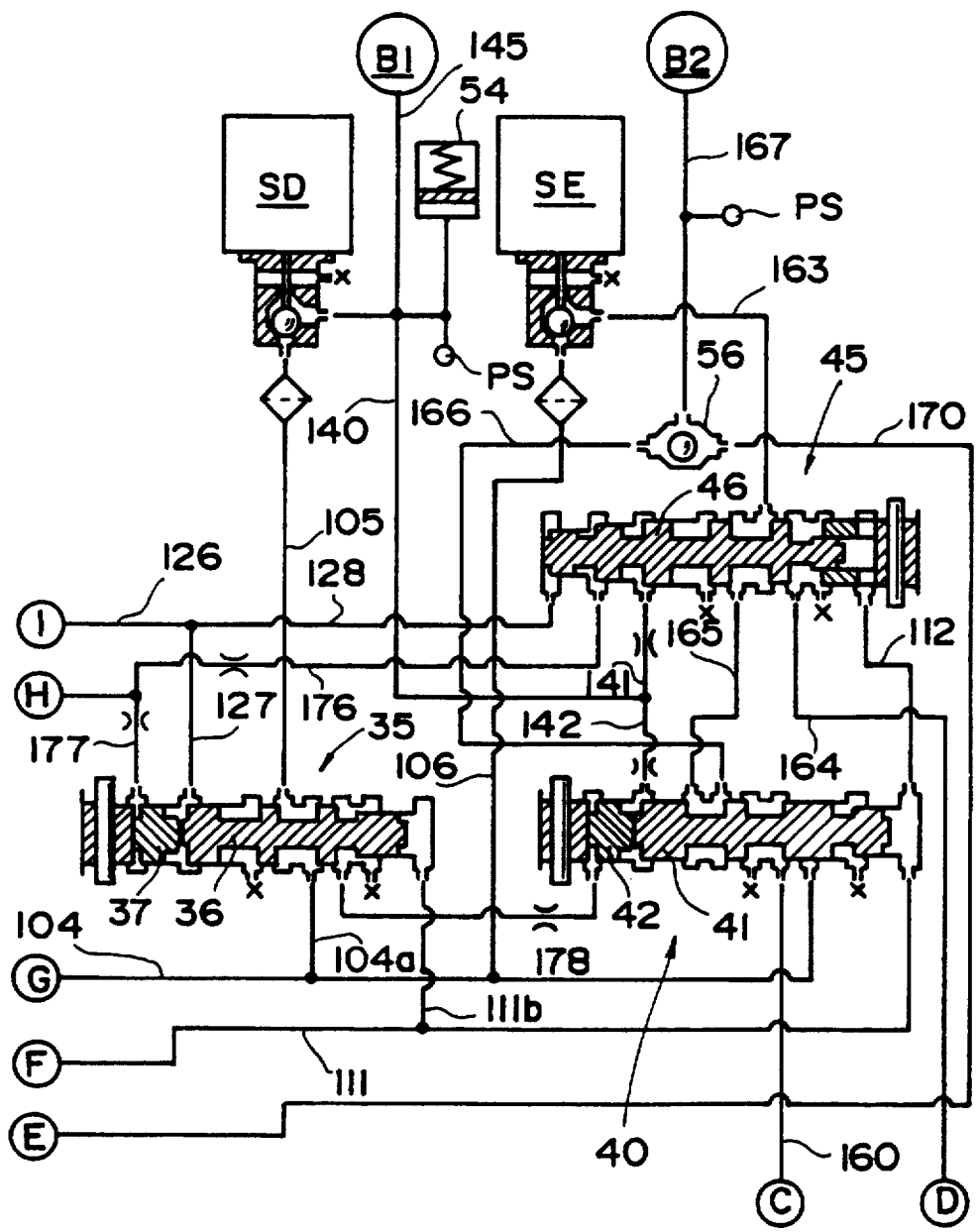

A control apparatus for controlling lubrication of the torque converter 10 and operation of a lock-up clutch LC and engagement and disengagement of the first, second, and third clutches K1, K2, K3, and the first and second brakes B1, B2 will be described below with reference to FIGS. 2, 3, and 4. FIGS. 2 through 4 show different portions of the control apparatus, and the illustrated different portions make up the control apparatus. In each of FIGS. 2 through 4, hydraulic passages marked with alphabetical letters A through I encircled by a circle are connected to hydraulic passages marked with the same alphabetical letters in the others of FIGS. 2 through 4.

The torque converter 10 comprises a main assembly composed of a pump 11, a stator 12, and a turbine 13, and a lock-up clutch LC. The lock-up clutch LC is disposed in a space surrounded by a casing 14 joined to the pump 11. The casing 14 is directly coupled to the output shaft of the engine.

The lock-up clutch LC comprises a clutch plate 15a fixed to the turbine 13, a pressure plate 15b fixed to the casing 14 in confronting relationship to the clutch plate 15a, and a lock-up piston 18 inserted in the casing 14 and defining a lock-up hydraulic chamber 17 between itself and the casing 14. The lock-up piston 16 has an outer circumferential edge facing the clutch plate 15a for clamping the clutch plate 15a between itself and the pressure plate 15b. When a lock-up controlling hydraulic pressure is introduced from a hydraulic passage 17a into the lock-up hydraulic chamber 17, the piston 16 is pressed by the introduced hydraulic pressure to clamp the clutch plate 15a between itself and the pressure plate 15b. Now, the lock-up clutch LC is engaged, causing the pump 11 and the turbine 13 to rotate in unison with each other. At this time, the stator 12 also rotates in unison with the pump 11 and the turbine 13 through a one-way clutch 12a which supports the stator 12.

The supply of working oil to the lock-up hydraulic chamber 17 is controlled by a lock-up control valve 4. The lock-up control valve 4 has an axially slidable spool 4a. When the spool 4a moves to the right under the bias of a spring as shown in FIG. 2, it closes a hydraulic passage 160 and connects a hydraulic passage 161, which is connected to the hydraulic passage 17a, to a drain. In FIGS. 2, 3, 4, 5, and 6, ports marked with "x" are connected to the drain.

A hydraulic passage 164 is connected to the righthand end of the spool 4a. The hydraulic passage 164 is supplied with a pilot hydraulic pressure when a solenoid-operated valve SE is actuated in a certain gear position, as described later on. The pilot hydraulic pressure acts on the righthand end of the spool 4a to move the spool 4a to the left, connecting the hydraulic passages 160, 161 to each other. Therefore, when the solenoid-operated valve SE is controlled, the lock-up control valve 4 is controlled to control the communication between the hydraulic passages 160, 161.

The hydraulic passage 160 is supplied with a predetermined hydraulic pressure to be applied to the lock-up clutch LC. Consequently, engagement and disengagement of the lock-up clutch LC is controlled by the solenoid-operated valve SE.

The lock-up clutch LC and the brakes B1, B2 and clutches K1, K2, K3 of the transmission mechanism are hydraulically controlled using the hydraulic pressure of working oil which is supplied from a tank 90 by a pump 91. The working oil discharged into a hydraulic passage 101 by the pump 91 acts through a hydraulic passage 101a on a regulator valve 20, by which the hydraulic pressure thereof is regulated to a predetermined line pressure P1. The working oil with the regulated line pressure P1 is supplied to the hydraulic passage 101 (see also FIG. 3).

The working oil discharged by the pump 91 is thus partly regulated in pressure by the regulator valve 20 and supplied to the hydraulic passage 101. The remainder of the working oil supplied to the regulator valve 20 is fed from the regulator valve 20 to a hydraulic passage 151. The working oil fed to the hydraulic passage 151 is branched into hydraulic passages 151a, 151b. The working oil flowing through the hydraulic passage 151a is supplied to the torque converter 10, whereas the working oil flowing through the hydraulic passage 151b is supplied to a first lubricating mechanism in which it lubricates desired components. After having lubricating the components in the first lubricating mechanism, the working oil returns to the tank 90.

The working oil delivered to the torque converter 10 circulates therein, and is then discharged into a hydraulic passage 153. From the hydraulic passage 153, the working oil is sent to a hydraulic passage 154 through a T/C check valve 93 coupled to the hydraulic passage 153. The T/C check valve 93 serves to regulate the hydraulic pressure in the hydraulic passage 153 for adjusting the hydraulic pressure in the torque converter 10 to a predetermined hydraulic pressure.

The working oil delivered to the hydraulic passage 154 is then cooled by an oil cooler 94, lubricates components in a second lubricating mechanism L2, and flows back to the tank 90.

The working oil, whose hydraulic pressure has been regulated to the line pressure P1, is supplied from the hydraulic passage 101 to the control apparatus portions shown in FIGS. 3 and 4 for controlling gear shifts in the transmission mechanism.

The control apparatus includes a manual valve 25 coupled to a shift lever at the driver's seat and operable in response to the driver's manual operation of the shift lever, five solenoid-operated valves SA, SB, SC, SD, SE, four hydraulically operated valves 30, 35, 40, 45, four accumulators 51, 52, 53, 54, and five hydraulic pressure sensors PS. The solenoid-operated valves SA, SC are normally open valves which are open when their solenoids are turned off. The solenoid-operated valves SB, SD, SE are normally closed valves which are closed when their solenoids are turned off.

The valve 30 is referred to as a first hydraulic pressure relief valve, the valve 35 as a second hydraulic pressure relief valve, the valve 40 as a brake relief valve, and the valve 45 a switching valve.

When the manual valve 25 and the solenoid-operated valves SA~SE are controlled, the valves 30, 35, 40, 45 are controlled to control gear shifts and operation of the lock-up clutch LC.

The solenoid-operated valves SA~SE are controlled to establish the gear positions as shown in Table 2 below. In Table 2, when the solenoid-operated valves SA~SE are operated, i.e., when their solenoids are energized, they are indicated by "ON", and when they are not operated, i.e., when their solenoids are de-energized, they are indicated by "OFF".

TABLE 2

| GEAR POSITION | SOLENOID | | | | |
|---|---|---|---|---|---|
| | SA | SB | SC | SD | SE |
| 1ST | OFF | OFF | ON | OFF | OFF (ON to apply Engine BRAKE) |
| 2ND | OFF | OFF | ON | ON | OFF (ON to engage Lock-up Clutch) |
| 3RD | OFF | OFF | OFF | OFF | OFF (ON to engage Lock-up Clutch) |
| 4TH | OFF | ON | ON | OFF | OFF (ON to engage Lock-up Clutch) |
| 5TH | ON | ON | OFF | OFF | OFF (ON to engage Lock-up Clutch) |
| REV | OFF | OFF | OFF | OFF | OFF |

The control process for controlling gear shifts and operation of the lock-up clutch LC will be described below.

It is assumed that a D range is selected by the shift lever, moving a spool 26 of the manual valve 25 to a position D (FIG. 3). That is, the hook on the righthand end of the spool 26 is moved from a position N (as shown) to the position D. The spool 26 thus moved allows a hydraulic passage 102 branched from the hydraulic passage 101 to communicate with a hydraulic passage 103, which is now supplied with the working oil under the line pressure P1.

The working oil under the line pressure P1 also flows into a hydraulic passage 110 branched from the hydraulic passage 101, and then into hydraulic passages 115, 111 both branched from the hydraulic passage 110. The hydraulic passage 115 is in turn branched into a hydraulic passage 116 connected to the solenoid-operated valve SA and a hydraulic passage 117 connected to the solenoid-operated valve SC. Therefore, the line pressure P1 acts on the solenoid-operated valves SA, SC at all times. From the hydraulic passage 111, there are branched hydraulic passages 111a, 111b connected to the righthand ends of the first and second hydraulic pressure relief valves 30, 35, respectively. The hydraulic passage 111 is connected to the righthand end of the brake relief valve 40, and also to the righthand end of the switching valve 45 through a hydraulic passage 112.

Therefore, the valves 30, 35, 40, 45 have respective spools pressed to the left under the line pressure P1 at all times.

In the D range, the gear positions are determined depending on the relationship between the load on the engine and the speed of the automobile. The solenoid-operated valves SA~SE are operated as shown in Table 2 in order to establish the determined gear positions.

Operation of the brakes B1, B2 and the clutches K1, K2, K3 in response to operation of the solenoid-operated valves SA~SE in each of the gear positions will be described below.

First, the first gear position (1ST) is to be established. To establish the first gear position, only the solenoid of the solenoid-operated valve SC is turned on and the solenoids of the other solenoid-operated valves SA, SB, SD, SE are turned off as shown in Table 2. Therefore, only the solenoid-operated valve SA is open, and the other solenoid-operated valves SB, SC, SD, SE are closed. In the first gear position, the solenoid-operated valve SE is used to apply an engine brake. If the engine brake is to be applied, then the solenoid of the solenoid-operated valve SE is turned on.

Since the line pressure P1 acts on the solenoid-operated valve SA from the hydraulic passage 116, the working oil flows under the line pressure P1 through the solenoid-operated valve SA into a hydraulic passage 120 which is connected to the manual valve 25. With the manual valve 25 in the position D, the hydraulic passage 120 communicates with a hydraulic passage 121. Thus, the working oil is supplied under the line pressure P1 through the hydraulic passage 121 to the first clutch K1, which is now engaged. The hydraulic passage 120 is also connected to the first accumulator 51 and one of the hydraulic pressure sensors PS.

The line pressure P1 acts on the lefthand end of the first hydraulic pressure relief valve 30 through a hydraulic passage 121a connected to the hydraulic passage 121. Since the hydraulic pressure acting on the righthand end of a spool 31 of the first hydraulic pressure relief valve 30 is greater than that which acts on the lefthand end of the spool 31 because of the difference between pressure-bearing areas of the ends of the spool 31, the spool 31 remains displaced to the left as shown in FIG. 3.

The second clutch K2 is connected to a hydraulic passage 125 which is coupled to the solenoid-operated valve SB. Inasmuch as the solenoid-operated valve SB is closed, the hydraulic passage 125 is connected to the drain through the solenoid-operated valve SB, so that the second clutch K2 is disengaged.

The third clutch K3 is connected to a hydraulic passage 130 which is connected to a hydraulic passage 131 or 133 through a shuttle valve 57. The hydraulic passage 131 is connected to the manual valve 25 through a hydraulic passage 132. When the manual valve 25 is in the position D, the hydraulic passage 132 communicates with the drain through the manual valve 25. The hydraulic passage 133 is also connected to the manual valve 25, which causes the hydraulic passage 133 to communicates with a hydraulic passage 134 when shifted to the position D. The hydraulic passage 134 is connected to the solenoid-operated valve SC. Since the solenoid-operated valve SC is closed at this time, the hydraulic passage 134 is connected to the drain through the solenoid-operated valve SC. Therefore, the third clutch K3 is also disengaged.

The first brake B1 is connected to the solenoid-operated valve SD through a hydraulic passage 140. Since the solenoid-operated valve SD is closed, the hydraulic passage 140 is connected to the drain through the solenoid-operated valve SD. Therefore, the first brake B1 is also disengaged.

The second brake B2 is connected to a hydraulic passage 167 that is connected to a hydraulic passage 166 or 170 through a shuttle valve 56. The hydraulic passage 166 is connected to the solenoid-operated valve SE through the brake relief valve 40, a hydraulic passage 165, the switching valve 45, and a hydraulic passage 163. Therefore, the second brake B2 can be engaged or disengaged under the control of the solenoid-operated valve SE for controlling the application of the engine brake in the first gear position.

In the first gear position, therefore, the solenoid-operated valve SE can be controlled to control the application of the engine brake.

The hydraulic passage 170 is connected to a hydraulic passage 171 or 172 through a shuttle valve 58. The hydraulic passages 171, 172 are connected to the drain through the manual valve 25.

In establishing the first gear position, the lock-up clutch LC operates as follows:

The lock-up clutch LC is engaged when supplied with a hydraulic pressure from the lock-up control valve 4 through the hydraulic passage 161. The hydraulic passage 160 connected to the lock-up control valve 4 is connected to the brake relief valve 40, which connects the hydraulic passage 160 to the drain when in the first gear position. Therefore, no working oil is supplied to the lock-up hydraulic chamber LC from the lock-up control valve 4, and hence the lock-up clutch LC is disengaged. Even if the spool 4a of the lock-up control valve 4 is shifted to the left, no working oil is supplied to the lock-up hydraulic chamber LC from the lock-up control valve 4, keeping the lock-up clutch LC disengaged.

The hydraulic passage 184 for supplying the pilot hydraulic pressure to control the lock-up control valve 4 is connected to the switching valve 45, which connects the hydraulic passage 164 to the drain when in the first gear position. Accordingly, in the first gear position, any pilot hydraulic pressure for engaging the lock-up clutch LC is not supplied from the lock-up control valve 4.

Then, the second gear position (2ND) is to be established. To establish the second gear position, only the solenoid of the solenoid-operated valve SD is turned on in addition to the solenoid of the solenoid-operated valve SC, as shown in Table 2. Therefore, the solenoid-operated valve SD is opened in addition to the solenoid-operated valve SA. The first clutch K1 remains engaged.

When the solenoid-operated valve SD is opened, the working oil is supplied under the line pressure P1 to the first brake B1 through a hydraulic passage 145, thereby engaging the first brake B1. Since the first clutch K1 and the first brake B1 are engaged, the second gear position is established.

When the solenoid-operated valve SD is opened, the working oil is also supplied under the line pressure P1 to the brake relief valve 40 and the switching valve 45 through the hydraulic passage 140 and hydraulic passages 141, 142, pushing respective spools 41, 46 of these valves 40, 45 to the right. Though the line pressure P1 also acts on the righthand ends of the spools 41, 46, the spools 41, 46 are moved to the right because of the differences between pressure-bearing areas of the ends of the spools 41, 46.

The rightward movement of the spools 41, 46 cuts off the communication, which has existed in the first gear position, between the solenoid-operated valve SE and the second brake B2. The hydraulic passage 166 connected to the second brake B2 is now connected to the drain through the brake relief valve 40. The second brake B2 is disengaged in the second gear position.

When the spool 41 of the brake relief valve 40 moves to the right, the hydraulic passage 104 supplied with the line pressure P1 is brought into communication with the hydraulic passage 160. Since the hydraulic passage 160 can be connected to the lock-up hydraulic chamber 17 through the lock-up control valve 4 and the hydraulic passage 161, the lock-up clutch LC can be controlled when the lock-up control valve 4 is controlled in the second gear position.

When the spool 46 of the switching valve 45 moves to the right, the hydraulic passage 163 connected to the solenoid-operated valve SE is brought into communication with the hydraulic passage 164 through the switching valve 45. Since the hydraulic passage 164 serves to supply the pilot hydraulic pressure to the lock-up control valve 4, the lock-up clutch LC can be controlled when the lock-up control valve 4 is controlled by controlling the solenoid-operated valve SE in the second gear position.

Then, the third gear position (3RD) is to be established. To establish the third gear position, only the solenoids of the solenoid-operated valves SC, SD are turned off from the solenoid condition in the second gear position, and hence the solenoids of all the solenoid-operated valves, as shown in Table 2. Therefore, the solenoid-operated valve SC is opened and the solenoid-operated valve SD is closed from the condition in the second gear position. Since the solenoid-operated valve SA is open, the first clutch K1 remains engaged.

When the solenoid-operated valve SD is closed, no hydraulic pressure is supplied to the hydraulic passage 145, which is connected to the drain through the solenoid-operated valve SD. Therefore, the first brake B1 is disengaged. At the same time, the hydraulic pressure acting on the brake relief valve 40 and the switching valve 45 through the hydraulic passages 140, 141, 142 is eliminated, releasing the spools 41, 46 of the hydraulic pressure.

When the solenoid-operated valve SC is opened, the working oil is supplied under the line pressure P1 to the hydraulic passage 134. Since the hydraulic passage 134 is connected to the hydraulic passage 133 through the manual valve 25, the working oil is supplied under the line pressure P1 through the shuttle valve 57 to the third clutch K3, engaging the third clutch K3.

Thus, the first clutch K1 and the third clutch K3 are engaged to establish the third gear position.

When the solenoid-operated valve SC is opened, the working oil which is supplied under the line pressure P1 to the hydraulic passage 133 is also supplied through hydraulic passages 175, 178, 177 connected to the hydraulic passage 133 to the lefthand sides of the first hydraulic pressure relief valve 30, the second hydraulic pressure relief valve 35, and the switching valve 45, moving the spool 31, spools 36, 37, and the spool 48 respectively thereof to the right. Upon rightward movement of the spools 36, 37 of the second hydraulic pressure relief valve 35, the working oil is introduced under the line pressure P1 from the hydraulic passage 104a and a hydraulic passage 178 to the lefthand end of a spool 42 of the brake relief valve 40, moving the spool 41 thereof to the right.

In the third gear position, therefore, the hydraulic passages 104, 160 also communicate with each other through the brake relief valve 40, making it possible to control the lock-up clutch LC. The hydraulic passage 163 connected to the solenoid-operated valve SE is connected to the hydraulic passage 164 through the switching valve 45. Therefore, the lock-up clutch LC can be controlled when the lock-up control valve 4 is controlled by controlling the solenoid-operated valve SE.

Now, the transmission mechanism is to be shifted from the third gear position to the fourth gear position (4TH). To establish the fourth gear position, only the solenoids of the solenoid-operated valves SB, SC are turned on from the solenoid condition in the third gear position, as shown in Table 2. Therefore, the solenoid-operated valve SB is opened and the solenoid-operated valve SC is closed from the condition in the third gear position. Since the solenoid-operated valve SA is open, the first clutch K1 remains engaged.

When the solenoid-operated valve SC is closed, the line pressure P1 is no longer supplied to the third clutch K3, which is now disengaged. Simultaneously, the line pressure P1 is no longer applied to the lefthand sides of the first hydraulic pressure relief valve 30, the second hydraulic pressure relief valve 35, and the switching valve 45 through the hydraulic passages 175, 176, 177, and to the lefthand side of the brake relief valve 40 through the hydraulic passages 104a, 178.

The spool 31 of the first hydraulic pressure valve 30 is now moved to the left, allowing the working oil to be supplied under the line pressure P1 from the hydraulic passage 103 to the hydraulic passage 107 through the first hydraulic pressure relief valve 30, and then through the solenoid-operated valve SB that is open and the hydraulic passage 125 to the second clutch K2, which is now engaged.

Thus, the first and second clutches K1, K2 are engaged to establish the fourth gear position.

The working oil that flows through the solenoid-operated valve SB is also supplied to the hydraulic passage 126, from which the working oil is supplied to the lefthand sides of the second hydraulic pressure relief valve 35 and the switching valve 45 through respective hydraulic passages 127, 128 connected to the hydraulic passage 128. Therefore, the spools 38, 46 of these valves 35, 45 are moved to the right. The rightward movement of the spool 36 of the second hydraulic pressure relief valve 35 allows the working oil to be supplied under the line pressure P1 from the hydraulic passage 104a through the hydraulic passage 178 to the lefthand side of the brake relief valve 40, moving the spool 41 thereof to the right.

Consequently, in the fourth gear position, the hydraulic passages 104, 180 also communicate with each other through the brake relief valve 40, making it possible to control the lock-up clutch LC. The hydraulic passage 163 connected to the solenoid-operated valve SE is connected to the hydraulic passage 164 through the switching valve 45. Therefore, the lock-up clutch LC can be controlled when the lock-up control valve 4 is controlled by controlling the solenoid-operated valve SE.

The transmission mechanism is to be shifted from the fourth gear position to the fifth gear position (5TH). To establish the fifth gear position, only the solenoid of the solenoid-operated valve SA is turned on and the solenoid of the solenoid-operated valve SC is turned off from the solenoid condition in the fourth gear position, as shown in Table 2. Therefore, the solenoid-operated valve SA is closed and the solenoid-operated valve SC is opened from the condition in the fourth gear position.

When the solenoid-operated valve SA is closed, the first clutch K1 is disengaged as no line pressure is supplied thereto through the hydraulic passages 120, 121.

When the solenoid-operated valve SA is closed, no hydraulic pressure is supplied from the hydraulic passage 121a, keeping the spool 31 of the first hydraulic pressure relief valve 30 displaced to the left. Simultaneously, since the solenoid-operated valve SB is open, the second clutch K2 remains engaged.

Upon opening of the solenoid-operated valve SC, the working oil is supplied under the line pressure P1 to the hydraulic passage 134, and then through the manual valve 25 and the hydraulic passages 133, 130 to the third clutch K3, thus engaging the third clutch K3.

Thus, the second and third clutches K2, K3 are engaged to establish the fifth gear position.

The working oil that is supplied to the hydraulic passage 133 when the solenoid-operated valve SC is opened is also supplied through the hydraulic passages 175, 176, 177 connected to the hydraulic passage 133 to the lefthand sides of the first hydraulic pressure relief valve 30, the second hydraulic pressure relief valve 35, and the switching valve 45, moving the spools 36, 37 and the spool 46 to the right. The spool 31 is not moved to the right as no hydraulic pressure is present in the hydraulic passage 121a. The rightward movement of the spools 36, 37 of the second hydraulic pressure relief valve 35 allows the working oil to be supplied under the line pressure P1 from the hydraulic passage 104a through the hydraulic passage 178 to the lefthand side of the brake relief valve 40, moving the spool 41 thereof to the right.

Consequently, in the fifth gear position, the hydraulic passages 104, 160 also communicate with each other through the brake relief valve 40, making it possible to control the lock-up clutch LC. The hydraulic passage 163 connected to the solenoid-operated valve SE is connected to the hydraulic passage 164 through the switching valve 45. Therefore, the lock-up clutch LC can be controlled when the lock-up control valve 4 is controlled by controlling the solenoid-operated valve SE.

The gear shifts in the D range have been described above. It can be seen that, in the first gear position (1ST) which is a low gear position, the working oil controlled by and supplied from the solenoid-operated valve SE is supplied to the second brake B2 through the switching valve 45 and the brake relief valve 40, and in the second through fifth gear positions (2ND~5TH) which are medium and high gear positions, the working oil controlled by and supplied from the solenoid-operated valve SE is supplied to the lock-up hydraulic chamber 17 through the switching valve 45 and the lock-up control valve 4.

Therefore, the solenoid-operated valve SE is used to control the operation of the second brake B2 when the first gear position is established, and to control the operation of the lock-up clutch LC when either one of the second through fifth gear positions is established.

The two directional control valves, i.e., the switching valve 45 and the brake relief valve 40, are disposed in series with each other in the hydraulic passages 163, 165, 166, 167 that extend from the solenoid-operated valve SE to the second brake B2. A signal hydraulic pressure for establishing the second through fifth gear positions is applied to the lefthand sides of these valves 45, 40. When either one of the second through fifth gear positions is to be established, the signal hydraulic pressure is applied to move the spools 48, 41 of the valves 45, 40 to the right.

In the subsequent description of the invention, it is assumed that the switching valve 45 or the brake relief valve 40 fails to operate.

For example, the spool 48 of the switching valve 45 sticks against movement after it has moved to the left as shown in FIG. 4. When the first gear position is to be established under such a condition, the spool 41 of the brake relief valve 40 is moved to the left, allowing the hydraulic pressure from the solenoid-operated valve SE to be supplied to the second brake B2, which is engaged.

When either one of the second through fifth gear positions is to be established, the spool 41 is moved to the right, closing off the hydraulic passage 165.

The hydraulic pressure from the solenoid-operated valve SE is supplied through the switching valve 45 and the hydraulic passage 165 to the brake relief valve 40. However, since the supplied hydraulic pressure is stopped by the brake relief valve 40 which closes the hydraulic passage 165, the lock-up clutch LC cannot be controlled. The hydraulic pressure from the second brake B2 is drained by the brake relief valve 40. Therefore, the problem of unstable gear shift control which would otherwise occur due to engagement of the second brake B2 while either one of the second through fifth gear positions is being established is prevented from taking place.

If the spool 46 sticks against movement after it has moved to the right, then the hydraulic pressure from the solenoid-operated valve SE is supplied to the lock-up control valve 4. Therefore, the gear shift control is prevented from being unstable.

Next, it is assumed that the spool 41 of the brake relief valve 40 sticks against movement after it has moved to the left as shown in FIG. 4. When the first gear position is to be established, the spool 46 of the switching valve 45 is moved to the left, supplying the hydraulic pressure from the solenoid-operated valve SE to the second brake B2, thus engaging the second brake B2.

When either one of the second through fifth gear positions is to be established, the spool 46 is moved to the right, supplying the hydraulic pressure from the solenoid-operated valve SE to the lock-up control valve 4. Therefore, the hydraulic pressure from the solenoid-operated valve SE is not supplied to the second brake B2.

Therefore, in the event of a failure of either one of the switching valve 45 and the brake relief valve 40, the second brake B2 which is used to establish the first gear position is not engaged when either one of the second through fifth gear positions is to be established, so that the problem of unstable gear shift control is avoided.

Now, it is assumed that an N range is selected by the shift lever.

The clutches K1, K2, K3 and the brakes B1, B2 are connected to the drain through the manual valve 25, and hence are disengaged to place the transmission gear trains in a neutral condition.

Now, it is assumed that an R range is selected by the shift lever.

The spool 26 of the manual valve 25 is moved to the left, supplying the working oil under the line pressure P1 from the hydraulic passage 102 through the manual valve 25 to the hydraulic passage 132. All the solenoids of the solenoid-operated valves SA~SE are turned off.

The hydraulic passage 121 connected to the first clutch K1 is drained through the manual valve 25, disengaging the first clutch K1. The hydraulic passage 125 connected to the second clutch K2 is also drained through the solenoid-operated valve SB, disengaging the second clutch K2.

Since the hydraulic passage 130 connected to the third clutch K3 is connected to the hydraulic passage 132 through the shuttle valve 57 and the hydraulic passage 131, the working oil supplied to the hydraulic passage 132 is supplied to the third clutch K3, engaging the third clutch K3. Therefore, in the R range, the working oil is supplied to the third clutch K3 directly through the manual valve 25 irrespective of operation of the solenoid-operated valves.

The hydraulic passage 145 connected to the first brake B1 is connected to the drain through the solenoid-operated valve SD, disengaging the first brake B1.

The hydraulic passage 167 connected to the second brake B2 is connected through the shuttle valve 56, the hydraulic passage 170, and the shuttle valve 58 to the hydraulic passage 171 or 172. The hydraulic passage 171 is connected through the manual valve 25 and the hydraulic passage 120 to the solenoid-operated valve SA, and the hydraulic passage 172 is connected through the manual valve 25 and the hydraulic passage 134 to the solenoid-operated valve SC. Therefore, the working oil flows under the line pressure P1 through the hydraulic passages 171, 172, thus engaging the second brake B2.

Therefore, the second brake B2 is engaged by the working oil which is supplied from the two solenoid-operated valves SA, SC through the hydraulic passages 171, 172 and collected by the shuttle valve 58. Therefore, even in the event of a failure of one of the solenoid-operated valves SA, SC, insofar as the other solenoid-operated valve operates normally, the working oil is supplied to the second brake b2 through the normal solenoid-operated valve.

Figure 7:
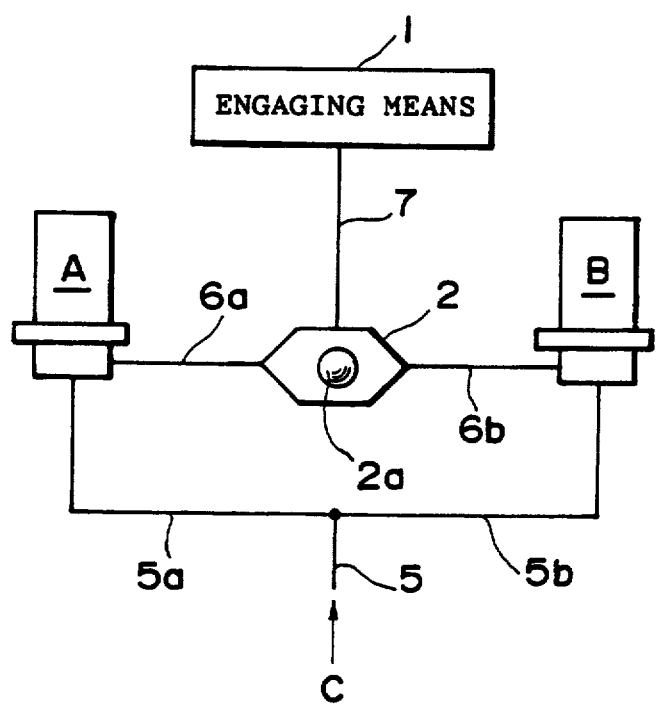
FIG. 7 is a circuit diagram of a portion of a hydraulic pressure control apparatus for an automatic transmission.

FIG. 7 schematically shows an arrangement composed of two solenoid-operated valves for controlling a single hydraulically operated engaging means.

The illustrated arrangement comprises a hydraulically operated engaging means 1, two solenoid-operated valves A, B for controlling the engaging means 1, and a shuttle valve 2 disposed in a hydraulic passage interconnecting the solenoid-operated valves A, B. The hydraulically operated engaging means 1 corresponds to the second brake B2 shown in FIG. 4, the two solenoid-operated valves A, B to the solenoid-operated valves SA, SC shown in FIG. 3, and the shuttle valve 2 to the shuttle valve 58 shown in FIG. 3.

Hydraulic passages 5a, 5b branched from a hydraulic passage 5 supplied with a predetermined hydraulic pressure, as indicated by the arrow C in FIG. 7, are connected to the solenoid-operated valves A, B, respectively. When the solenoid-operated valves A, B are opened or closed, they can control the supply of the predetermined hydraulic pressure to the hydraulic passages 6a, 6b. The shuttle valve 2 collects the working oil supplied to the hydraulic passages 6a, 6b, and supplies the working oil to the hydraulically operated engaging means 1.

To engage the hydraulically operated engaging means 1, the solenoid-operated valves A, B are opened to supply the hydraulic pressure from the hydraulic passage 5 through the hydraulic passages 6a, 6b, 7 to the hydraulically operated engaging means 1. Normally, both the solenoid-operated valves A, B are opened to supply the hydraulic pressure therefrom to the hydraulically operated engaging means 1.

If either one of the solenoid-operated valves A, B, e.g., the solenoid-operated valve A, fails to operate, and cannot be opened, then the solenoid-operated valve B is opened to supply the hydraulic pressure to the hydraulically operated engaging means 1. At this time, a ball 2a of the shuttle valve 2 is shifted to the left under the hydraulic pressure supplied to the hydraulic passage 6b, thus closing the hydraulic passage 6a to prevent the working oil from leaking through the malfunctioning solenoid-operated valve A.

The hydraulically operated engaging means 1 can be engaged when it is supplied with the predetermined hydraulic pressure irrespective of which hydraulic passage it is supplied through. Consequently, the hydraulically operated engaging means 1 can be engaged when it is supplied with the hydraulic pressure through either both the solenoid-operated valves A, B or one of the solenoid-operated valves A, B.

As described above, the hydraulic pressure is supplied to the hydraulically operated engaging means 1 when the solenoid-operated valves A, B are controlled. Even if either one of the solenoid-operated valves A, B fails to function, the other solenoid-operated valve can supply the hydraulic pressure to actuate the hydraulically operated engaging means 1.

The reverse gear position is thus established when the third clutch K3 and the second brake B2 are engaged. The third clutch K3 is engaged irrespective of operation of the solenoid-operated valves, and the second brake B2 is engaged under the hydraulic pressure from the two solenoid-operated valves SA, SC. Accordingly, when the manual valve 25 is shifted to the R range position, the reverse gear position is established to reverse the automobile. Even in the event of a failure of either one of the solenoid-operated valves SA, SC, the second brake B2 can reliably be engaged by the other normal solenoid-operated valve, so that the automobile can continuously be allowed to move backwards.

Controlling the lock-up clutch LC at the time of establishing the reverse gear position will be described below. The lock-up clutch LC can be engaged under the hydraulic pressure that is supplied from the lock-up control valve 4 through the hydraulic passage 161. The hydraulic passage 160 that can be connected to the hydraulic passage 161 is connected to the brake relief valve 40, and is drained through the brake relief valve 40 in the reverse gear position. Even if the spool 4a of the lock-up control valve 4 sticks in the leftward position, therefore, no working oil is supplied to the lock-up hydraulic chamber 17, and the lock-up clutch LC is not engaged.

The hydraulic passage 164 for supplying the pilot hydraulic pressure to control the lock-up control valve 4 is connected to the switching valve 45, and is drained through the switching valve 45 in the reverse gear position. In the reverse gear position, therefore, no pilot hydraulic pressure is supplied which would otherwise enable the lock-up control valve 4 to engage the lock-up clutch LC.

In the low gear position (first gear position) or the reverse gear position, the supply of the working oil to the lock-up clutch LC is prevented by the brake relief valve 40 which serves as a backup valve. Therefore, even in the event of a failure of the lock-up control valve 4 or the solenoid-operated valve SE for controlling the lock-up clutch LC, the lock-up clutch LC is prevented from being engaged. When the automobile with the illustrated automatic transmission is stopped in the D or R range, since the transmission mechanism is in the first gear position or the reverse gear position, the lock-up clutch LC is necessarily disengaged, and the engine is prevented from stalling.

An arrangement for ensuring such disengagement of the lock-up clutch LC will be described in detail below with reference to FIG. 5.

Figure 5:
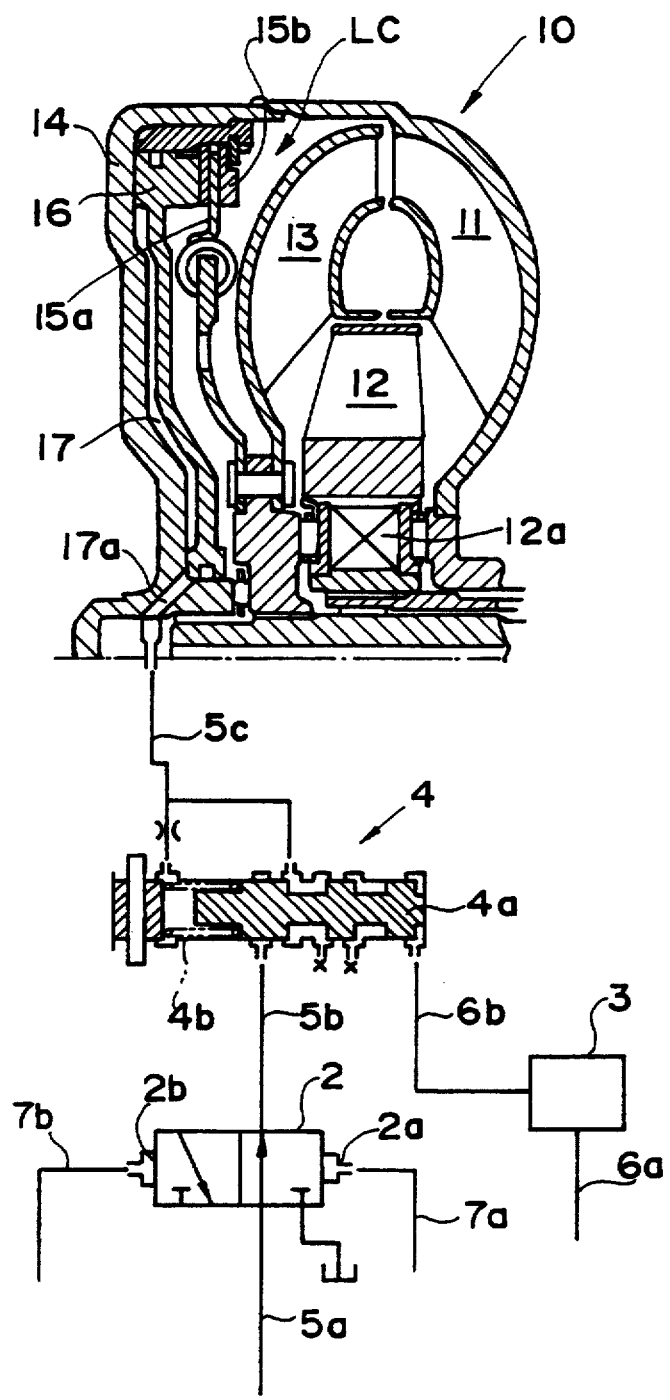
FIGS. 5 and 6 are circuit diagrams of a hydraulic pressure control apparatus for another lock-up clutch.

FIG. 5 shows the torque converter 10 and the lock-up control valve 4 together with a backup valve 2 and a solenoid-operated valve 3 which are connected to the lock-up control valve 4. The backup valve 2 corresponds to the brake relief valve 40 (FIG. 4) and the solenoid-operated valve 3 to the solenoid-operated valve SE (FIG. 4).

The lock-up hydraulic chamber 17 is supplied with working oil from the lock-up control valve 4 and the backup valve Z under the control of the solenoid-operated valve 3. The lock-up controlling hydraulic pressure is supplied to the lock-up hydraulic chamber 17 is supplied through hydraulic passages 5a, 5b, 5c in which the backup valve 2 and the lock-up control valve 4 are disposed in series with each other.

The backup valve 2 is shifted to the left to bring the hydraulic passages 5a, 5b into communication with each other when a hydraulic pressure is applied from a hydraulic passage 7a to a righthand port 2a. When a hydraulic pressure is applied from a hydraulic passage 7b to a lefthand port 2b, the backup valve 2 is shifted to the right, closing the hydraulic passage 5a and draining the hydraulic passage 5b. The righthand hydraulic passage 7a is supplied with a hydraulic pressure for establishing gear positions (i.e., medium and high gear positions) in which the torque converter 10 is to be locked up. The lefthand hydraulic passage 7b is supplied with a hydraulic pressure for establishing gear positions (i.e., low and reverse gear positions) in which the torque converter 10 is not to be locked up.

When one of the gear positions (i.e., medium and high gear positions) in which the torque converter 10 is to be locked up is selected, the hydraulic pressure for establishing the selected gear position is applied to the righthand port 2a. Since no hydraulic pressure is applied to the lefthand port 2b, the hydraulic passages 5a, 5b are brought into communication with each other. When one of the gear positions (i.e., low and reverse gear positions) in which the torque converter 10 is not to be locked up is selected, the hydraulic pressure for establishing the selected gear position is applied to the lefthand port 2b. Since no hydraulic pressure is applied to the righthand port 2a, the hydraulic passage 5a is closed and the hydraulic passage 5b is connected to the drain.

Inasmuch as the backup valve 2 is forcibly shifted under the controlling hydraulic pressure applied to the port 2a or 2b, it is unlikely for the spool thereof to stick against movement.

When the spool 4a of the lock-up control valve 4 is moved to the right, as shown in FIG. 5, under the bias of a spring 4b, it closes the hydraulic passage 5b and connects the hydraulic passage 5c to the drain.

The hydraulic passage 6b is connected to the righthand end of the spool 4a, and also to the hydraulic passage 6a through the solenoid-operated valve 3. The hydraulic passage 6a is supplied with a predetermined hydraulic pressure at all times, so that the solenoid-operated valve 3 can be controlled to develop a pilot hydraulic pressure in the hydraulic passage 6b.

When the pilot hydraulic pressure is developed and applied to the righthand end of the spool 4a, the spool 4a is moved to the left, bringing the hydraulic passages 5b, 5c into communication with each other. Consequently, the solenoid-operated valve 3 can be controlled to control the lock-up control valve 4 for bringing the hydraulic passages 5b, 5c into or out of communication with each other.

Upon a failure of the solenoid-operated valve 3 keeping itself closed, no working oil flows from the hydraulic passage 6a to the hydraulic passage 6b, and hence no pilot hydraulic pressure is developed in the hydraulic passage 6b. The spool 4a remains displaced to the right under the resiliency of the spring 4b. Therefore, the hydraulic passage 5c is connected to the drain, and no hydraulic pressure is applied to the hydraulic passage 17, thereby disengaging the lock-up clutch LC. In the event of a failure of the solenoid-operated valve 3, therefore, because the lock-up clutch LC is disengaged, the engine on the automobile is prevented from stalling when the automobile is stopped in the D range.

If the solenoid-operated valve 3 is kept open due to a failure thereof, then the pilot hydraulic pressure is continuously applied to the righthand end of the spool 4a, keeping the spool 4a shifted to the right. Therefore, the hydraulic passages 5c, 5b are held in communication with each other. When the lock-up controlling hydraulic pressure is supplied to the hydraulic passage 5b, the lock-up clutch LC is engaged to lock up the torque converter 10.

However, the backup valve 2 connected between the hydraulic passages 5b, 5a supplies the lock-up controlling hydraulic pressure to the hydraulic passage 5b only when one of the gear positions (i.e., medium and high gear positions) in which the torque converter 10 is to be locked up is selected. The backup valve 2 drains the hydraulic passage 5b when one of the gear positions (i.e., low and reverse gear positions) in which the torque converter 10 is not to be locked up is selected.

Even in the event of a failure of the solenoid-operated valve 3 to allow the lock-up control valve 4 to keep the hydraulic passages 5c, 5b in communication with each other, when a gear position such as a low gear position in which the torque converter 10 is not to be locked up is selected, the lock-up clutch LC is disengaged. The automatic transmission establishes a low gear position when the automobile is running at low speed, and the automobile stops while the low gear position is being established. Consequently, when the automobile stops with the solenoid-operated valve 3 malfunctioning, since the lock-up clutch LC is disengaged, the engine is prevented from stalling.

The lock-up control valve 4 itself may fail to operate. If the spool 4a thereof sticks against movement from the leftward position owing to its own failure, then the hydraulic passages 5c, 5b are kept in communication with each other, tending to keep the lock-up clutch LC engaged. The spool 4a of the lock-up control valve 4 is likely to stick against movement because the spring 4b for moving the spool 4a to the right should not be too large. However, when a gear position such as a low gear position in which the torque converter 10 is not to be locked up is selected, as described above, the backup valve 2 operates to disengage the lock-up clutch LC.

Therefore, even when the lock-up control valve 4 fails to operate, the lock-up clutch LC is disengaged at least in a low gear position, preventing the engine from stalling at the time the automobile comes to a stop.

In the above embodiment, the lock-up clutch is engaged when pushed by the lock-up piston 16 in response to the hydraulic pressure of the working oil supplied into the lock-up hydraulic chamber 17. Another lock-up clutch which comprises a lock-up piston engageable by a casing that is pushed under the internal pressure of a torque converter will be described below with reference to FIG. 6.

Figure 6:
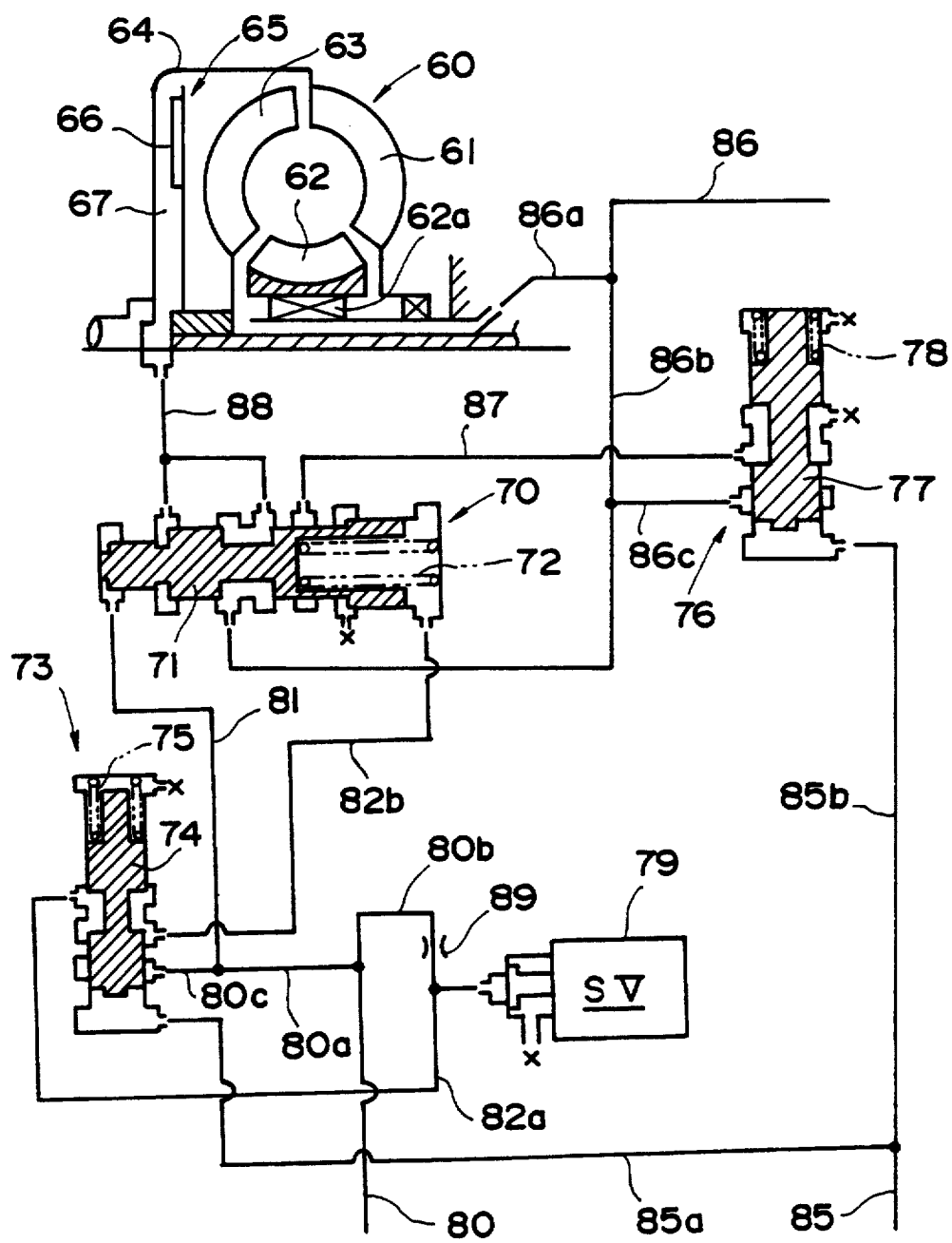

As shown in FIG. 6, a torque converter 60 comprises a main assembly composed of a pump 61, a stator 62, and a turbine 63, and a lock-up clutch 65. The lock-up clutch 65 is disposed in a space surrounded by a casing 64 joined to the pump 61. The casing 64 is directly coupled to the output shaft of the engine.

The lock-up clutch 65 has a clutch plate 66 attached to the turbine 63 and facing the casing 64 with a back-pressure chamber 67 defined between the clutch plate 66 and the casing 64. When the hydraulic pressure in the back-pressure chamber 67 becomes lower than the internal pressure of the torque converter 60, the clutch plate 64 is pushed to the left under the internal pressure of the torque converter 60 until the clutch plate 64 abuts against and engages the inner surface of the casing 64. Now, the lock-up clutch 65 is engaged, causing the pump 61 and the turbine 63 to rotate in unison with each other. At this time, the stator 62 also rotates in unison with the pump 61 and the turbine 63 through a one-way clutch 62a which supports the stator 62.

When the internal pressure of the torque converter 60 acts in the back-pressure chamber 67, the pressures acting on the opposite sides of the clutch plate 66 are brought into equilibrium. The clutch plate 66 is disengaged from the casing 64, and so is the lock-up clutch 65.

The back-pressure chamber 67 is connected to a lock-up control valve 70 through a hydraulic passage 88. When working oil is supplied under the same hydraulic pressure as the internal pressure of the torque converter 60 to the hydraulic passage 88 from the lock-up control valve 70, the lock-up clutch 65 is disengaged. When the hydraulic passage 88 is connected to the drain, the lock-up clutch 65 is engaged.

The lock-up control valve 70 has a spool 71 normally pressed to the left under the bias of a spring 72. Hydraulic passages 82b, 81 are connected to the righthand and lefthand ends, respectively, of the spool 71. The hydraulic passage 81 is supplied with a predetermined hydraulic pressure through hydraulic passages 80, 80a at all times for normally urging the spool 71 to the right. The hydraulic passage 82b is connected to a lock-up switching valve 73.

The lock-up switching valve 73 has a spool 74 normally pressed downwardly under the bias of a spring 75. The spool 74 has a lower end connected to a hydraulic passage 85a. The hydraulic passage 85a is coupled to a hydraulic passage 85 which is supplied with a controlling hydraulic pressure for establishing gear positions in which the torque converter 60 is to be locked up.

When one of the gear positions (i.e., medium and high gear positions) in which the torque converter 60 is to be locked up is selected, the predetermined hydraulic pressure is supplied to the hydraulic passage 85a, moving the spool 74 upwardly against the bias of the spring 75 so that the hydraulic passage 82b is connected to a hydraulic passage 82a. The hydraulic passage 82a is positioned downstream of an orifice 89, and can be connected to the drain by a solenoid-operated valve 79. Therefore, the hydraulic pressure in the hydraulic passage 82a can be controlled by the solenoid-operated valve 79. As a result, the solenoid-operated valve 79 can control the hydraulic pressure which acts on the righthand side of the lock-up control valve 70 through the hydraulic passage 82b for the control of the lock-up clutch 70.

When one of the gear positions (i.e., low and reverse gear positions) in which the torque converter 60 is not to be locked up is selected, no hydraulic pressure is present in the hydraulic passage 85a, and the spool 74 descends. The hydraulic passage 82b is connected to a hydraulic passage 80c, and supplied with the hydraulic pressure from the hydraulic passage 80 for thereby moving the spool 71 of the lock-up control valve 70 to the left as shown. The hydraulic passage 88 now communicates with the interior of the torque converter 80 through hydraulic passages 88b, 88a. The internal pressure of the torque converter 60 is introduced into the lock-up hydraulic chamber 67, whereupon the lock-up clutch 65 is disengaged.

As described above, when one of the gear positions in which the torque converter 60 is to be locked up is selected, the lock-up clutch 85 can be engaged by the solenoid-operated valve 79, and when one of the gear positions in which the torque converter 60 is not to be locked up is selected, the lock-up clutch 65 is disengaged.

With the spool 71 moved to the right, the hydraulic passage 88 is connected to a backup valve 76 through a hydraulic passage 87. The backup valve 76 has a spool 77 normally pressed downwardly under the bias of a spring 78, the spool 77 having a lower end connected to a hydraulic passage 85b that is coupled to the hydraulic passage 85. When one of the gear positions (i.e., low and reverse gear positions) in which the torque converter 60 is not to be locked up is selected, the spool 77 descends under the bias of the spring 78, the hydraulic passage 87 is connected to a hydraulic passage 86c that is connected to the hydraulic passage 86b. When one of the gear positions (i.e., medium and high gear positions) in which the torque converter 60 is to be locked up is selected, the spool 77 ascends as shown, connecting the hydraulic passage 87 to the drain.

Normally, when a gear position in which the torque converter 60 is not to be locked up is selected, the spool 71 of the lock-up control valve 70 is moved to the left, introducing the internal pressure of the torque converter 60 into the lock-up hydraulic chamber 67 to disengage the lock-up clutch 65. Even if the spool 71 remains shifted to the right due to a failure of the solenoid-operated valve 79 or the spool 71 sticking against leftward movement, insofar as a gear position in which the torque converter 60 is not to be locked up is selected, the hydraulic pressure 87 communicates with the hydraulic passage 86c through the backup valve 76, permitting the internal pressure of the torque converter 60 to be introduced into the lock-up hydraulic chamber 67.

With the lock-up control circuit arrangement shown in FIG. 6, even in the event of a failure of the lock-up control valve 70 or the solenoid-operated valve 79 for the control of the lock-up clutch 65, the lock-up clutch 65 is prevented from being engaged insofar as a gear position in which the torque converter 60 is not to be locked up is selected. Therefore, even when the automobile which is equipped with the automatic transmission with the lock-up control circuit arrangement shown in FIG. 6 is brought to a stop while the transmission is in the D or R range, since the first or reverse gear position is always established when the automobile stops, the lock-up clutch 65 is necessarily disengaged, and the engine is prevented from stalling.

Although certain preferred embodiments of the present invention have been shown and described in detail, it should be understood that various changes and modifications may be made therein without departing from the scope of the appended claims.

What is claimed is:

1. A hydraulic pressure control apparatus for an automatic transmission, comprising:
   a hydraulic pressure source for producing a controlling hydraulic pressure;
   hydraulically operated engaging means for being engaged in response to the controlling hydraulic pressure from said hydraulic pressure source;
   two solenoid-operated valve means disposed in series with each other in a hydraulic passage between said hydraulic pressure source and said hydraulically operated engaging means and independently operable in response to respective control signals, for controlling the supply of the controlling hydraulic pressure to said hydraulically operated engaging means; and
   said two solenoid-operated valve means being responsive to said respective control signals for being opened to supply the controlling hydraulic pressure from said hydraulic pressure source to said hydraulically operated engaging means to engage the hydraulically operated engaging means, and wherein when at least one of said two solenoid-operated valve means is closed, the supply of controlling hydraulic pressure from said hydraulic pressure source to said hydraulically operated engaging means is disrupted and said hydraulically operated engaging means is connected to a drain, thereby positively disengaging said engaging means.

2. A hydraulic pressure control apparatus according to claim 1, wherein said two solenoid-operated valve means comprise, respectively, a solenoid-operated valve for generating a control signal hydraulic pressure in response to the control signals, and a directional control valve disposed in said hydraulic passage and operable in response to said control signal hydraulic pressure for opening or closing said hydraulic passage.

3. A hydraulic pressure control apparatus according to claim 1, wherein said two solenoid-operated valve means compromise a solenoid-operated valve disposed in said hydraulic passage and operable in response to said control signals for opening or closing said hydraulic passage.

4. A hydraulic control apparatus for an automatic transmission, comprising:
   a plurality of hydraulically operated engaging means for controlling gear positions in the automatic transmission, wherein one of said hydraulically operated engaging means comprises a brake engageable for establishing a low gear position;
   hydraulically operated lock-up control means for achieving a lock-up in a torque converter of the automatic transmission;
   a hydraulic pressure source for supplying a controlling hydraulic pressure to said hydraulically operated engaging means; and
   two valve means disposed in a hydraulic passage between said hydraulic pressure source and said brake;
   one of said two valve means comprising a brake relief valve; and
   the other one of said two valve means comprising a switching valve; and
   wherein when the low gear position is established, said brake relief valve and said switching valve open said hydraulic passage, and when a medium or high gear position is established, said relief valve connects said brake to the drain and said switching valve connects said hydraulic pressure source to said hydraulically operated lock-up control means.

5. A hydraulic pressure control apparatus according to claim 4, further including a solenoid-operated valve for controlling the supply of said controlling hydraulic pressure from said hydraulic pressure source, and wherein when the low gear position is established, said solenoid-operated valve supplies the controlling hydraulic pressure to said brake, and when the medium or high gear position is established, said solenoid-operated valve supplies the controlling hydraulic pressure to said hydraulically operated lock-up control means.

6. A hydraulic pressure control apparatus for an automatic transmission, comprising:
   a hydraulic pressure source for supplying a lock-up controlling hydraulic pressure;
   a hydraulically operated lock-up engaging means for controlling a lock-up in a torque converter of the automatic transmission;
   two valve means connected in series with each other and disposed in a hydraulic passage between said hydraulic pressure source and said lock-up engaging means;
   said two valve means being respectively shiftable into an operating position in response to a control signal for engaging said lock-up engaging means;
   the supply of said lock-up controlling hydraulic pressure to said lock-up engaging means through said hydraulic passage being controlled to engage said lock-up engaging means to achieve the lock-up only when both of said two valve means being shifted to the operating positions;
   one of said two valve means being operable in response to the selection of gear positions; and
   when one of said gear positions in which the lock-up is unnecessary is selected, the lock-up controlling hydraulic pressure being controlled by said one of two valve means to disengage said lock-up engaging means even if the other of said two valve means is being operated to engage said lock-up engaging means.

7. A hydraulic pressure control apparatus according to claim 6, wherein said hydraulically operated engaging means comprises a lock-up clutch, said two valve means comprising, respectively, a lock-up control valve for selectively supplying and discharging the lock-up controlling hydraulic pressure to and from said lock-up clutch, and a backup valve for selectively supplying and discharging the lock-up controlling hydraulic pressure in response to a controlling hydraulic pressure supplied as a result of the selection of specific gear positions in the automatic transmission.

8. A hydraulic pressure control apparatus according to claim 7, further including a solenoid-operated valve for applying a pilot hydraulic pressure to operate said lock-up control valve to engage said lock-up clutch.

9. A hydraulic pressure control apparatus according to claim 7, wherein said lock-up clutch comprises a lock-up hydraulic chamber and a lock-up piston movably disposed in said lock-up clutch and pressable in response to the lock-up controlling hydraulic pressure introduced into said lock-up hydraulic chamber, said lock-up clutch being engageable when said lock-up piston is pressed, said lock-up control valve comprising a valve disposed in a lock-up hydraulic passage between said hydraulic passage between said hydraulic pressure source and said lock-up hydraulic chamber for selectively opening and closing said lock-up hydraulic passage, said backup valve comprising a valve disposed in said lock-up hydraulic pressure source and said lock-up control valve for closing said lock-up hydraulic passage when said one of said gear positions in which the lock-up is unnecessary is selected.

10. A hydraulic pressure control apparatus for an automatic transmission, comprising:
- a hydraulic pressure source for producing a controlling hydraulic pressure;
- a torque converter;
- a hydraulically operated lock-up clutch for controlling a lock-up of the automatic transmission, said lock-up clutch comprising a casing and a lock-up piston pressable into engagement with said casing in response to an internal pressure of said torque converter, said lock-up clutch being engageable when said lock-up piston is pressed, said lock-up piston and said casing defining a back pressure chamber therebetween; and
- two valve means, shiftable into an operating position in response to a control signal from said hydraulic pressure source, said valve means comprising, respectively, a lock-up control valve and a backup valve, said lock-up control valve comprising a valve disposed in a lock-up hydraulic passage for introducing the internal pressure of the torque converter into said back pressure chamber, for selectively opening and closing said lock-up hydraulic passage, said lock-up control valve being connected to a bypass hydraulic passage which communicates with said back pressure chamber when said lock-up hydraulic passage is closed, said backup valve being disposed in said bypass hydraulic passage for introducing said internal pressure of the torque converter into said bypass hydraulic passage when at least one of said gear positions in which the lock-up of the automatic transmission is not to be achieved is selected, and for connecting said bypass hydraulic passage to a drain when the other gear positions in which the lock-up of the automatic transmission is to be achieved are selected.

11. A hydraulic pressure control apparatus for an automatic transmission, comprising:
- a hydraulically operated brake engageable for establishing a low speed gear position;
- a hydraulically operated lock-up control means for achieving a lock-up in a torque converter of the automatic transmission;
- a hydraulic pressure source for supplying a controlling hydraulic pressure to said specified hydraulically operated engaging means;
- two valve means disposed in series in a hydraulic passage between said hydraulic pressure source and said hydraulically operated brake which is engageable when said low speed gear position is selected, said two valve means being controlled based on a control signal to establish said specified gear position;
- one of said two valve means comprising means for opening said hydraulic passage when it receives the control signal to establish said low speed gear position, and for connecting said hydraulic pressure source to said hydraulically operated lock-up control means when it receives a control signal to establish another gear position;
- the other of said two valve means comprising means for opening said hydraulic passage when it receives the control signal to establish said low speed gear position, and for connecting said hydraulically operated engaging means to a drain when it receives the control signal to establish said other gear position; and
- wherein said one of the valve means comprises a brake relief valve and said other of the valve means comprises a switching valve,
- when the low speed gear position is established, said brake relief valve and said switching valve open said hydraulic passage, and
- when a medium speed or high speed gear position is established, said brake relief valve connects said brake to the drain and said switching valve connects said hydraulic pressure source to said hydraulically operated lock-up control means.

12. A hydraulic pressure control apparatus according to claim 11, further including a solenoid-operated valve for controlling the supply of said controlling hydraulic pressure from said hydraulic pressure source, and
- wherein when the low speed gear position is established, said solenoid-operated valve supplies the controlling hydraulic pressure to said brake, and
- when the medium speed or high speed gear position is established, said solenoid-operated valve supplies the controlling hydraulic pressure to said hydraulically operated lock-up control means.

13. A hydraulic pressure control apparatus according to claim 7, wherein said lock-up clutch comprising a casing and a lock-up piston pressable into engagement with said casing in response to an internal pressure of said torque converter, said lock-up clutch being engageable when said lock-up piston is pressed, said lock-up piston and said casing defining a back pressure chamber therebetween, said lock-up control valve comprising a valve disposed in a lock-up hydraulic passage for introducing the internal pressure of the torque converter into said back pressure chamber, for selectively opening and closing said lock-up hydraulic passage, said lock-up control valve being connected to a bypass hydraulic passage which communicates with said back pressure chamber when said lock-up hydraulic passage is closed, said backup valve being disposed in said bypass hydraulic passage for introducing said internal pressure of the torque converter into said bypass hydraulic passage when one of said gear positions in which the lock-up is unnecessary is selected, and for connecting said bypass hydraulic passage to a drain when the other gear positions in which the lock-up is necessary are selected.

14. A hydraulic pressure control apparatus for an automatic transmission, comprising:
- a specified hydraulically operated engaging means to establish a specified gear position in the automatic transmission;
- a hydraulically operated lock-up control means for achieving a lock-up in a torque converter of the automatic transmission;
- a hydraulic pressure source for selectively supplying a controlling hydraulic pressure to said specified hydraulically operated engaging means and to said lock-up control means;
- first valve means which selectively connects hydraulic pressure source with either said hydraulically operated engaging means or with said lock-up control means; and second valve means disposed in a hydraulic line between said first valve means and said specified hydraulically operated engaging means;

wherein when a control signal to establish said specified gear position is received by said first and second valve means, said second valve means opens said hydraulic line and said first valve means connects said hydraulic pressure source with said specified hydraulically operated engaging means through said hydraulic line to supply said controlling hydraulic pressure to said engaging means; and when a control signal to achieve said lock-up is received by said first and second valve means, said second valve means closes said hydraulic line and said first valve means connects said hydraulic pressure source with said lock-up control means.

15. A hydraulic pressure control apparatus according claim 14, wherein when said control signal to achieve said lock-up is received by said second valve means, said second valve means connects said engaging means with a drain.

* * * * *